July 26, 1927.
R. O. SCHROEDER ET AL
1,637,132
CHICKEN FEEDER
Filed June 29, 1926
2 Sheets-Sheet 2
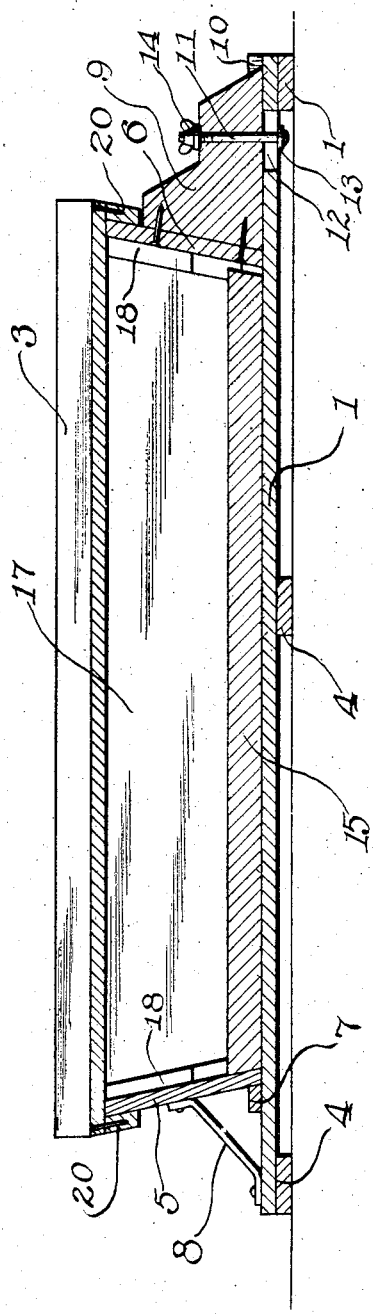
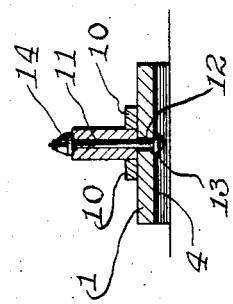
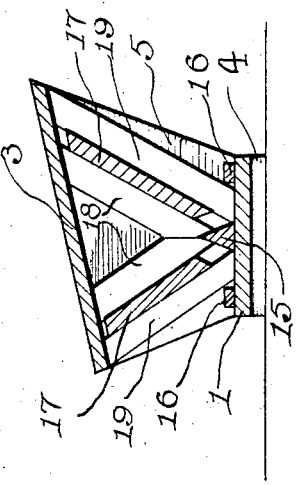
Inventor
R. O. Schroeder,
G. Forslund
By Lacey & Lacey, Attorneys Patented July 26, 1927.

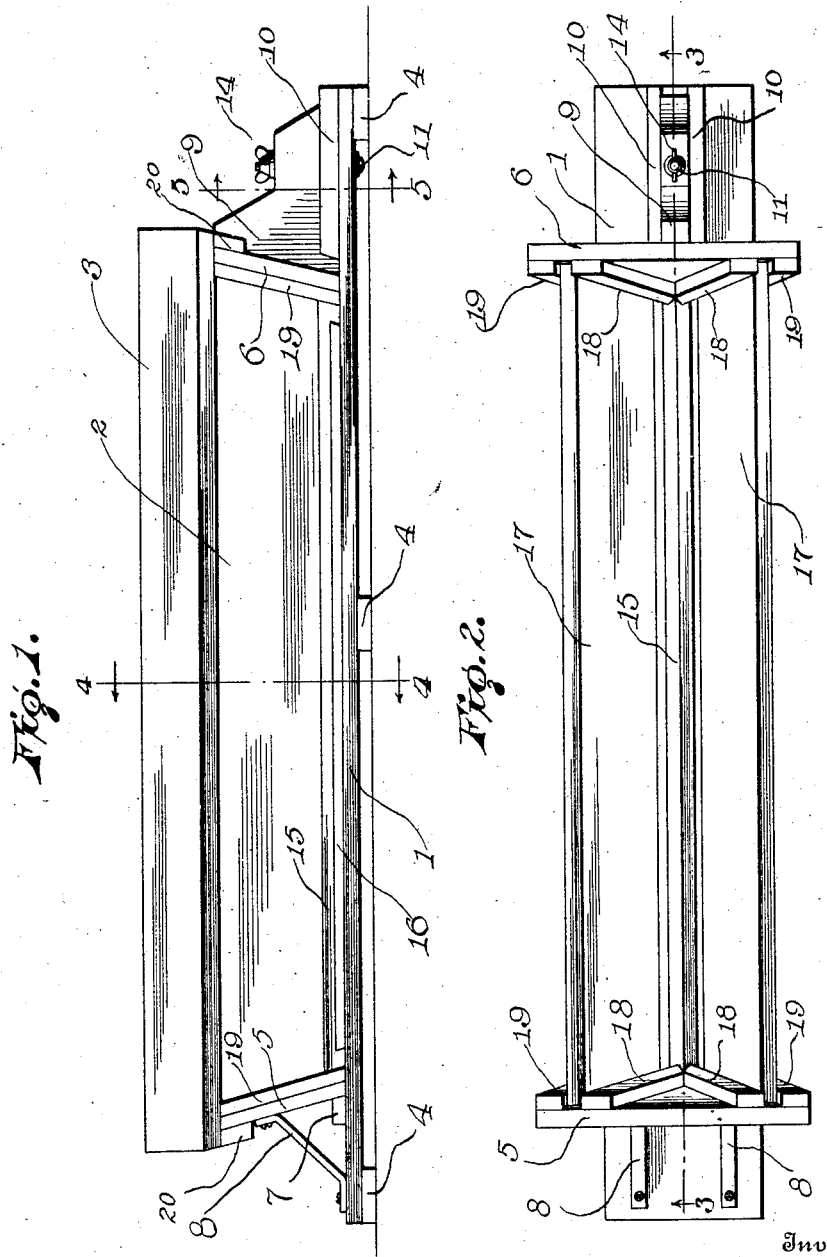

1,637,132

UNITED STATES PATENT OFFICE.

REX O. SCHROEDER AND GUST FORSLUND, OF YANKTON, SOUTH DAKOTA.

CHICKEN FEEDER.

Application filed June 29, 1926. Serial No. 119,401.

This invention relates to feeders and more particularly to a feeder of the hopper type in which a supply of food may be placed and gradually fed into a feeding pan or trough as the food therein is consumed.

One object of the invention is to provide a feeder so constructed that the speed at which the feed passes out of the hopper may be readily controlled.

Another object of the invention is to provide the hopper with side walls adapted to serve as gates to control the size of its outlet.

Another object of the invention is to so mount the end walls of the hopper that they may be adjusted towards and away from each other and firmly support the side walls in an elevated and predetermined spaced relation to each other and provide an outlet between their lower edges of a desired size.

The invention is illustrated in the accompanying drawings, wherein

Figure 1 is a view showing the improved feeder in side elevation;

Fig. 2 is a top plan view of the feeder;

Fig. 3 is a longitudinal sectional view taken on the line 3—3 of Fig. 2;

Fig. 4 is a transverse sectional view taken on the line 4—4 of Fig. 1;

Fig. 5 is a transverse sectional view taken on the line 5—5 of Fig. 1.

The feeder forming the subject-matter of this invention includes a base 1 which may be referred to as a feeding pan or trough and a hopper 2 carried by the base and provided with a cover 3. The base 1 is preferably formed of wood and consists of a flat board supported intermediate its length and at its ends by cross strips 4 so that it will be held in spaced relation to the ground and air may circulate beneath it.

The end walls 5 and 6 of the hopper are also preferably formed of wood and rest upon the base 1 and converge towards the base, as clearly shown in Figs. 1 and 3. The end wall 5 constitutes a stationary wall and has its lower end engaging the inner side face of a cross strip 7 secured upon the upper face of the base. Bracing bars 8 are secured to the base and upper portion of the stationary end wall and serve to firmly hold the end wall in proper angular relation to the base. It will thus be seen that the end wall 5 will be very firmly held in place and cannot move out of the proper position.

The end wall 6, which may be referred to as a removable or adjustable end wall, rests upon the upper face of the base and is secured against the inner end face of an arm 9 which projects towards the end of the base between guide strips 10 and carries a securing bolt 11. The bolt 11 passes through a slot 12 formed longitudinally in the base between the strips 10 and at its lower end carries a washer 13 which overlaps the under face of the base at opposite sides of the slot 12 so that, when the securing nut 14 is tightened, the adjustable wall will be firmly but releasably held in a set position in predetermined spaced relation to the end wall 5. A partition or ridge strip 15 extends longitudinally of the trough from the stationary end wall and is nailed or otherwise firmly secured to the base 1. Referring to Fig. 4, it will be seen that the ridge strip tapers upwardly in cross section and will serve to guide feed onto the base 1 where the feed will be held upon the base by the strips 16 which are secured upon its upper face and extend longitudinally thereof between the end walls, as shown in Fig. 1.

The side walls 17 fit between the end walls and have their ends cut so that they converge downwardly towards their lower ends and extend substantially parallel to the inner faces of the end walls. The side walls may, therefore, have wedging fit between the end walls and when the movable end wall has been secured in a set position relative to the stationary end wall the side walls may only pass downwardly between the end walls a predetermined distance and their lower ends will be retained in spaced relation to the side faces of the ridge strip and form outlets of a predetermined size. The side walls must be supported in converging relation to each other, as shown in Fig. 4, and in order to do so each end wall carries inner and outer seat forming strips 18 and 19 which are secured against their inner faces in spaced relation to each other, as shown in Fig. 4. Referring to this figure, it will be seen that the seats between the strips 18 and 19 converge downwardly so that the side walls may have movement towards and away from the side faces of the ridge strip.

When the feeder is in use, the movable end wall is released by loosening the nut 14 and may then be moved longitudinally upon the base towards or away from the stationary end wall. As it is moved away from the stationary end wall, the side walls which fit between the seats carried by the end walls will slide downwardly towards each other and the outlets at opposite sides of the ridge strip will be decreased in size. If it is desired to increase the size of the outlets, the side walls must be lifted and the movable end wall then moved toward the stationary end wall until it engages the adjacent ends of the side walls and causes the side walls to be firmly held in place. After the movable end wall has been adjusted to the proper position upon the base, the securing nut 14 is again tightened and the removable end wall will be firmly held in a set position with the side walls supported in proper spaced relation to the ridge strip. The cover or top 3 may now be slid into place transversely of the hopper and since the side strips 20 engage the outer side faces of the end walls it will be held in place and cannot be accidentally knocked off. The upper ends of the end walls slope toward one side of the hopper so that the cover will be disposed at an incline and will serve to shed rain. The cover does not, however, slide freely enough upon the end walls to be liable to move out of proper covering relation to the hopper. By having the side walls mounted, as shown, they may be easily adjusted so that grain or meal may flow freely through the outlets beneath the side walls onto the base at opposite sides of the ridge strip but will not be liable to feed too rapidly. The chickens will therefore, at all times have a supply of food upon the base or feeding pan. It should also be noted that since the side walls and top are removable and the end walls 6 may be detached and entirely removed from the base it will be possible to very thoroughly clean the feeder.

Having thus described the invention, we claim:

1. A feeder comprising end walls converging downwardly, one being adjusted towards and away from the other, side walls between said end walls and having their ends parallel thereto, and means to releasably secure the movable end wall stationary with the side walls wedged between the end walls and thereby held in a set position with their lower ends in predetermined spaced relation to each other.

2. A feeder comprising end walls converging downwardly and one adjustable towards and away from the other, side walls between said end walls and having their ends parallel thereto, the inner faces of said end walls being provided with seats to receive the end portions of said side walls and support the side walls in converging relation towards their lower ends, and means to releasably secure the movable end wall in a set position with the side walls wedged between the end walls and their lower ends in predetermined spaced relation to provide an outlet.

3. A feeder comprising end walls converging downwardly and one adjustable towards and away from the other, side walls between said end walls and having their ends parallel thereto, the inner faces of said end walls being provided with seats to receive the end portions of said side walls and support the side walls in downwardly converging relation to each other, a partition extending between said end walls and adapted to have opposite side faces engaged by the lower faces of said side walls, and means to releasably secure the movable end wall in a set position with the side walls supported in predetermined spaced relation to said partition to provide outlets at opposite sides of the partition.

4. A feeder comprising a base, end walls carried by said base, one being movable toward and away from the other, means to releasably secure the adjustable wall in a set position, downwardly converging side walls extending between said end walls and frictionally gripped thereby, said side walls being vertically adjustable between the end walls to move their lower ends towards and away from each other to provide an outlet of determined size and being held in a set position by the end walls.

5. A feeder comprising a base, end walls carried by said base, one being adjustable toward and away from the other, a partition extending upwardly from said base between said end walls, and side walls between said end walls converging downwardly towards said partition, said side walls being frictionally gripped by the end walls and adjustable towards and away from the partition to provide outlets of determined size at opposite sides thereof.

6. A feeder comprising a base, end walls carried by said base, a ridge extending upwardly from said base between said end walls, and side walls between said end walls converging downwardly towards said ridge, one end wall being adjustable towards and away from the other whereby said side walls may be gripped between the end walls and held with their lower edges in predetermined spaced relation to said ridge to provide outlets.

7. A feeder comprising a base, end walls carried by said base, side walls between said end walls, said side walls converging downwardly and each having its ends converging downwardly, said end walls converging downwardly and disposed substantially parallel to adjacent ends of the side walls and one being adjustable towards and away from the other, and means to releasably secure the movable end wall in a set position with the side walls supported between the end walls with their lower edges in predetermined spaced relation to each other.

8. A feeder comprising a base, end walls carried by said base and converging downwardly, the inner faces of said end walls being provided with seats converging towards their lower ends, a ridge extending upwardly from said base between said end walls, one end wall being adjustable along said base towards and away from the other end wall, means to releasably secure the movable end wall in a set position, and side walls each having its ends converging downwardly, said side walls having their end portions fitted into the seats of said end walls and supported between the end walls in predetermined spaced relation to said ridge.

9. A feeder comprising a base formed with a longitudinally extending slot, end walls carried by said base and converging downwardly, the inner faces of said end walls being provided with seats converging towards their lower ends, a ridge extending upwardly from said base between said end walls, one end wall being adjustable along said base towards and away from the other end wall, an arm extending from said adjustable end wall, a fastener passed through the slot formed longitudinally in said base and engaged with said arm to releasably hold the movable end wall in a set position, guides carried by said base at opposite sides of said arm, and side walls each having its ends converging downwardly, said side walls having their end portions fitted into said seats and supported between the end walls with their lower ends spaced from said ridge a predetermined distance to provide outlets at opposite sides of the ridge.

In testimony whereof we affix our signatures.

REX O. SCHROEDER. [L. S.]
GUST FORSLUND. [L. S.]